United States Patent [19]

Deibel

[11] 4,007,511
[45] Feb. 15, 1977

[54] VEHICLE WINDSHIELD WIPER BLADE ASSEMBLIES

[75] Inventor: Raymond A. Deibel, West Falls, N.Y.

[73] Assignee: Trico Products Corporation, Buffalo, N.Y.

[22] Filed: Apr. 7, 1975

[21] Appl. No.: 565,641

[52] U.S. Cl. .......................................... 15/250.42
[51] Int. Cl.² .......................................... B60S 1/02
[58] Field of Search .................. 15/250.32–250.42

[56] References Cited

UNITED STATES PATENTS

| 2,905,961 | 9/1959 | Oishei et al. | 15/250.42 |
| 2,937,393 | 5/1960 | Brueder | 15/250.42 |
| 3,392,415 | 7/1968 | Shipman | 15/250.42 |
| 3,634,902 | 1/1972 | Smithers et al. | 15/250.42 |
| 3,673,631 | 7/1972 | Yamadai et al. | 15/250.42 |
| 3,879,794 | 4/1975 | Roberts, Jr. | 15/250.42 |

FOREIGN PATENTS OR APPLICATIONS

| 1,564,376 | 4/1969 | France | 15/250.42 |
| 795,075 | 5/1958 | United Kingdom | 15/250.42 |

Primary Examiner—Peter Feldman
Attorney, Agent, or Firm—E. Herbert Liss

[57] ABSTRACT

A superstructure for a windshield wiper blade assembly includes a pair of primary levers connected together by a spring hinge which urges the outer ends of the levers toward the superstructure. A third lever is pivoted at the transverse hinged axis. The primary levers are tubular in cross section for substantially their entire length and have integrally formed wiping element receiving claws at their outboard ends. The inboard ends are formed with an integral web and depending apertured ears, the web and ears forming a spring retainer, the ears being interfittable and having their apertures aligned to receive a transverse hinge pin.

1 Claim, 5 Drawing Figures

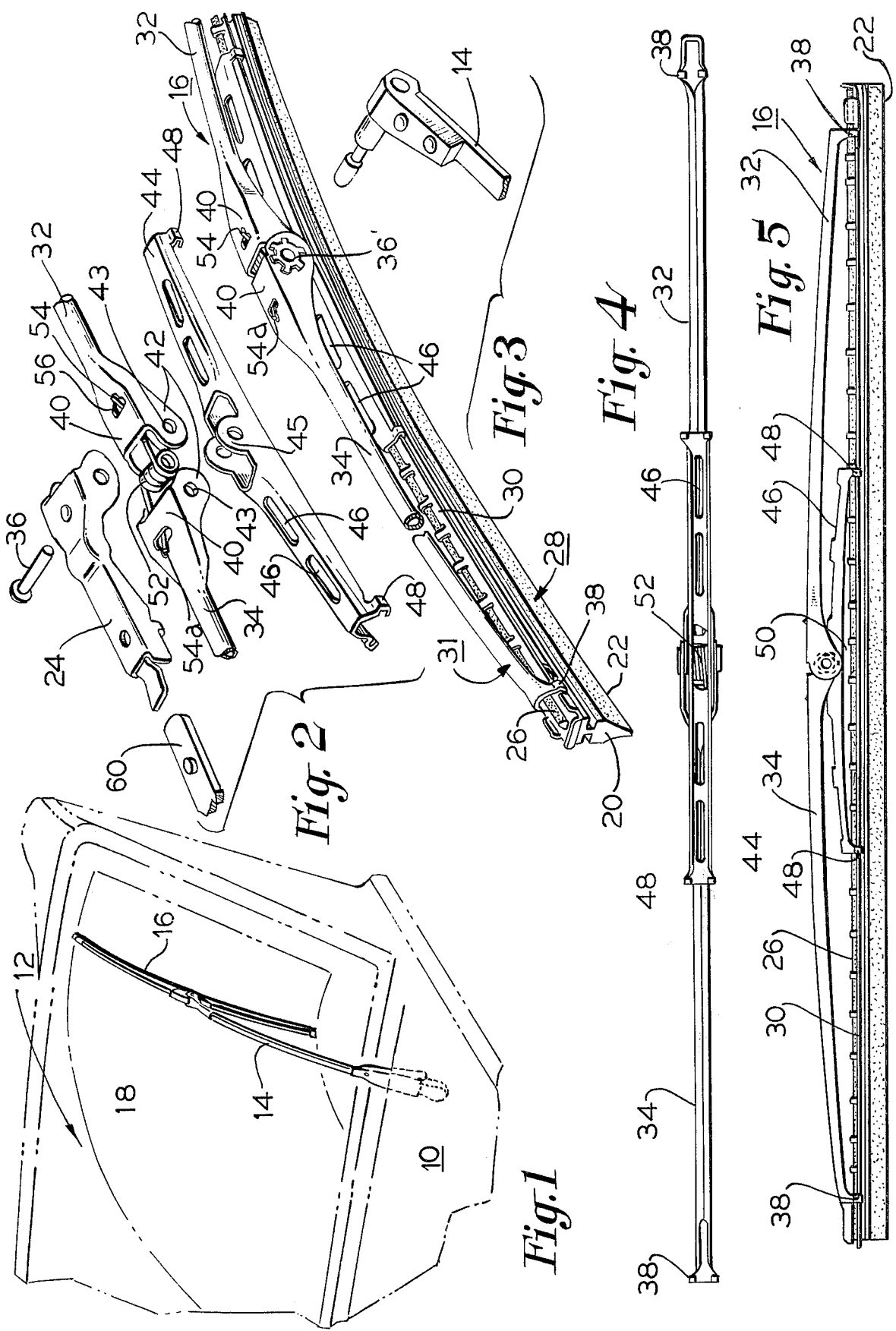

VEHICLE WINDSHIELD WIPER BLADE ASSEMBLIES

BACKGROUND OF THE INVENTION

The present invention relates to a wiper blade and more particularly to an anti-windlift wiper blade superstructure.

Windshield wiper blade superstructures are commonly of U-shaped cross section. They are subject to forces tending to lift the blade assembly off of the windshield by the car-created windstream at high speeds, thus rendering them ineffective for adequate wiping under such conditions. Superstructures in which the levers have a round cross section to overcome this problem are known in the prior art. Examples of these are the wiper blades disclosed in British Patent 858,220 published Jan. 11, 1961 and British Pat. No. 1,109,971 published April 18, 1968. A similar construction appears in U.S. Design Patent 221,535 issued Aug. 24, 1971. There appears to be a single bowed wire superstructure in U.S. Pat. No. 3,132,367 issued May 12, 1964 which is substantially different in mode of operation. All of these patents disclose a solid wire construction rather than a tubular construction and, therefore, introduce certain inherent functional and manufacturing difficulties.

Wiper blades of solid wire having a multiple lever system require separate parts for securing the wiping element to the superstructure and for the connections between the levers. This introduces additional assembly steps thereby increasing labor time and the possibility of lack of stability at the joints. The solid wire construction also results in substantially increased weight relative to its strength in resistance to bending and torsion forces. Design Patent No. 221,535 utilizes U-shaped secondary levers at its outboard ends which severely diminishes the anti-windlift effect.

SUMMARY OF THE INVENTION

According to the present invention a superstructure is provided which includes a pair of dominating primary levers pivotally connected together end to end by a transverse pin member. A torsion spring surrounds the pin member and its ends engage the levers to bias the outboard ends thereof toward a flexible wiping element to which the levers are slidably engaged at their outboard ends. The levers are formed into a tube from flat stock material with the outer ends being formed into opposed claws for slidably engaging a wiping element. The inboard ends are formed into a web with depending apertured ears, the ears of one lever being interfittable with the ears of the other levers. The apertures in the ears are disposed in transverse alignment to receive the pin member. A third lever is pivoted intermediate its ends upon the pin member. It is of generally U-shaped configuration in cross section having elongate openings spaced apart along the length of its web with opposed claws formed at each end.

A dominating force applied at the pin member by a spring biased wiper arm acts against the force applied by the torsion spring. These forces can be balanced so as to distribute the pressure along the length of the wiping element in a suitable or desirable manner. In accordance with the more specific aspects of this invention the external force applied at the pin and the force of the torsion spring are so balanced that the external applied force dominates the torsion spring, and the pressure transmitted to the wiping element in the medial span is greater than the pressure transmitted to its ends. The tubular shape of the primary levers diminishes the effect of windlift as do the openings in the third lever. However, there is greater surface in the third lever exposed to the lifting forces of the car-created windstream than at the outer end of the blade where the superstructure is tubular in cross section. Thus balancing the forces as described hereinabove counteracts the lifting tendency of the medial span of the wiping element due to increased exposure to windlift. Furthermore, the increased pressure on the medial portion assures effective wiping pressure at the center of the blade in the line of the driver's sight where it is most essential. Such balancing of forces with the pyramidal structure shown in the above-mentioned Design Patent No. 221,535 would decrease the pressure at the ends of the blade where it is more vulnerable to windlift. The secondary yokes are similar to the third or secondary lever of the instant invention and are disposed at the ends of the blade. Two such levers at the outer ends produce substantially more exposure to windlift than a single secondary lever in the medial portion. It should be noted that with the arrangements shown in the instant invention there are four pressure points producing three spans just as in the Design Patent No. 221,535. Thus it can be seen that use of the spring-urged hinge type primary levers of tubular configuration with a single secondary lever of open U-shaped configuration greatly reduces exposure to windlift. It should also be noted that the tubular construction enables formation of integral connecting parts avoiding the difficulties and increased costs in assembling numerous separate connecting parts. It should further be noted that the tubular structure results in an improved strength-weight ratio.

Accordingly it is an object of the present invention to provide a windshield wiper blade having improved anti-windlift characteristics.

It is another object of the present invention to provide a windshield wiper blade assembly which is simple in construction and economical to manufacture.

It is still another object of the invention to provide an improved windshield wiper blade of the type described which utilizes a minimum number of parts, results in improved strength-weight ratio and provides integral and stable connecting elements in an anti-windlift tubular structure.

Other objects and advantages of the invention will be apparent from the following detailed description taken in connection with the accompanying drawings.

BRIEF DESCRIPTION OF THE DRAWINGS

FIG. 1 is a fragmentary perspective view of a motor vehicle having the present windshield wiper blade assembly installed thereon;

FIG. 2 is an exploded fragmentary perspective view of the wiper blade of this invention;

FIG. 3 is a perspective view illustrating a modified embodiment of the invention;

FIG. 4 is a bottom plan view of the wiper blade assembly superstructure of this invention; and FIG. 5 is a side elevation of the wiper blade assembly of the modification shown in FIG. 3.

DESCRIPTION OF THE PREFERRED EMBODIMENTS

Referring more particularly to the drawing in FIG. 1, motor vehicle 10 includes a windshield 12. A wiper arm 14 carrying a wiper blade assembly 16 at its free end is mounted for oscillatory motion below the windshield 12 on a rockshaft, not shown, connected to a wiper motor, not shown, in the conventional manner to trace a path 18 across the windshield. The arm 14 is spring urged toward the windshield and applies a force at its connection with the wiper blade assembly 16 to urge the wiper blade against the windshield 12.

The wiper blade assembly 16 comprises a flexible wiping element 28 supported in an articulated pressure distributing superstructure 31. The flexible wiping element 28 includes an elastomeric squeegee 20 supported by a flexible, resilient backing strip 30. The squeegee element is formed with a wiping lip 22 along one marginal edge and an anchoring bead 26 along the opposite marginal edge joined by a reduced neck portion to the body of the squeegee 20. The anchoring bead 26 is threaded through a central longitudinal slot 24 in the flexible, resilient backing strip 30. This anchors the squeegee 20 to the flexible backing strip 30.

The superstructure 31 comprises a pair of primary levers 32 and 34 which extend lengthwise of the wiper blade assembly in end-to-end relation and which have their adjacent inner ends pivotally connected by a transverse hinge pin member 36. The pair of primary levers 32 and 34 are each tubular in cross section and are formed from flat stock material. At their outboard ends they are formed with opposed claws 38 which slidably engage the outer longitudinal edges of the backing strip 30. At their inboard ends the primary levers 32 and 34 are formed with a relatively flat web portion 40 having depending apertured ears 42 at each edge. The ears 42 of the levers 32 and 34 are interfittable with each other and have their apertures 43 in transverse alignment to receive the pin member 36 therethrough. The pin member 36 forms a transverse axis about which the levers 32 and 34 pivot. A torsion spring 52 surrounds the pin 36. Its ends 54 and 54a engage the upper surface of the web 40 of the primary levers through openings 56 formed by a struck-down portion of the web. The web 40 and ears 42 of the pair of levers 32 and 34 form a spring retainer in which the torsion spring is contained.

A secondary or third lever member 44 is pivoted intermediate its ends about the pin member 36. The third lever member 44 is of generally U-shaped configuration with central upstanding apertured ears 45 struck out from the upper surface. The apertures on the ears 45 are disposed in alignment with the apertures in the ears 42 of primary levers 32 and 34. The third lever member 44 has elongate openings 46 on its web surface, the openings being elongate in the direction of the longitudinal axis of the blade assembly. The open surface of the third lever 44 is of greater area than the solid surface to permit the airstream to pass therethrough with extremely little obstruction. Opposed claws 48 are formed at the ends of the third lever 44 and slidably engage opposed edges of the backing strip 30 intermediate the ends thereof to define a medial span 50.

In the modification illustrated in FIG. 2 an arm retaining bayonet-type clip 58 is pivoted to the pin member 36. This may be of a suitable channel shaped construction to receive the arm tip 60 as shown in U.S. Pat. No. 3,056,160 issued Oct. 2, 1962.

In the embodiment illustrated in FIG. 3 the pin member 36 is replaced by a hollow tubular transverse pin member 36' serving as a transverse receptor having a cutout portion through which the torsion spring 52 can pass. The transverse receptor 36' forms an arm connector for a side mounted pin type arm to blade connection such as that shown in U.S. Pat. No. 3,378,874 issued Apr. 23, 1968.

It can be seen that the torsion spring 52 biases the primary levers 32 and 34 toward the flexible wiping element 20. When the blade is attached to the arm and the arm is mounted on a motor vehicle the force of spring urged arm 14 is applied at the pin member 36 or 36'. The force applied by the arm dominates and acts against the force of the torsion spring 52, thereby maintaining the medial span 50 of the wiper blade assembly 16 against the windshield. In accordance with the more specific aspects of the invention the external force applied by the wiper arm and the force applied by the torsion spring are so balanced that the pressure applied to the medial span is somewhat greater than the pressure applied to the end of the blade at claws 38. Thus the increased exposure to windlift in the medial span 50 because of the shape of the third lever is counteracted by the increased pressure applied in this area and also assures that under extreme windlift conditions the medial span which is in line with the driver's line of sight will clear the windshield effectively.

It should now be apparent that an improved anti-windlift wiper blade has been provided which is economical to manufacture and consists of a minimum number of parts to facilitate assembly and insure stability of the blade. It provides a unique tubular construction of the primary levers to minimize windlift coupled with a unique arrangement of the non-tubular open third lever to minimize windlift more effectively at the outboard ends of the blade and to permit distribution of forces to overcome windlift by increased pressure where it is most susceptible.

Although certain specific embodiments of the invention have been shown and described for the purpose of illustration it will be apparent that in accordance with the broader aspects of the invention various modifications and other embodiments are possible. It is, therefore, understood that the invention is not limited to the specific arrangement shown but in its broadest aspects it includes all equivalent embodiments and modifications which come within the scope of the invention.

What is claimed is:

1. In a windshield wiper blade assembly for motor vehicles comprising a flexible wiping element, an articulated pressure distributing superstructure for supporting said wiping element comprising a pair of primary levers pivoted at their inboard ends to a pin member and slidably engaging at their outboard ends the flexible wiping element adjacent its outboard ends, a torsion spring surrounding the pin member and having its ends engaging the lever members to urge the outboard ends thereof in the direction of the flexible wiping element, a third lever member pivotally supported on said pin member intermediate the ends of said third lever and having its ends slidably engaging the wiping element at points spaced substantially from the free ends of the wiping element, and means for applying pressure at said pin dominating the urge of said torsion spring characterized in that the primary levers are each tubular in cross section for substantially their entire length, the adjacent end portions having an integrally formed web and depending apertured ears forming a torsion spring retainer, the ears of one of said primary levers being interfittable with the ears of the other of said primary levers, the apertures being in transverse alignment to receive said pin member, the outboard ends of said primary levers having integrally formed claws for slidable engagement with said wiping element, said third lever comprising an elongate web portion having depending sides at each edge, said web portion having spaced-apart openings along its length and opposed claws at each end slidably engaging the wiping element, said openings being elongated in the direction of the longitudinal axis of said third lever, the open area of the web of said third lever being greater than the solid area.

* * * * *